Patented Sept. 29, 1942

2,296,891

UNITED STATES PATENT OFFICE 2,296,891

CEMENT

Bjorn Andersen, Maplewood, N. J., assignor, by mesne assignments, to Celanese Corporation of America, a corporation of Delaware No Drawing. Application November 9, 1940, Serial No. 365,043

7 Claims. (Cl. 106—180)

This invention relates to the general class of cements, and relates more particularly to a cement for attaching thin films or foils made of or containing a derivative of cellulose to textile fabric or other sheet material.

It is an object of this invention to provide an improved cement for bonding thin films or foils made of or containing a derivative of cellulose to textile fabric or other sheet material.

Another object of this invention is the provision of a cement which is particularly for attaching cellulose acetate foil or thin film to textile fabric or leather.

Other objects of this invention will appear from the following detailed description.

I have discovered that a cement, which is eminently suitable for attaching cellulose acetate foil to textile fabric or leather, may be prepared by dissolving 100 parts by weight of nitrocellulose and from 60 to 100 or more parts by weight of a suitable plasticizer and from 600 to 1,000 or more parts by weight of a suitable solvent medium. However, the cement of my invention also gives good results when employed for bonding any derivative of cellulose sheet material to paper, cardboard, wood, leather, cotton and synthetic or natural silk fabrics.

While any suitable plasticizer may be employed in accordance with my invention, I prefer to use, when attaching cellulose acetate foil to textile fabric or leather, a substance which is a plasticizer for both nitrocellulose and cellulose acetate such as, for example, dimethyl phthalate, dibutyl tartrate, methyl phthalyl ethyl glycollate, ethyl phthalyl ethyl glycollate and a mixture of ortho and para toluene ethyl sulphonamides. I have found that the use of a single solvent such as acetone, for example, is not satisfactory since it evaporates too fast leaving a dry surface and rendering adequate adhesion uncertain. I prefer, therefore, to use as a solvent medium a mixture of low-boiling and medium-boiling solvents, such as a mixture of acetone and mono methyl ether of ethylene glycol. In place of the mono methyl ether of ethylene glycol I may use ethyl lactate, mono methyl ether of ethylene glycol acetate, dioxan, diacetone alcohol and other medium-boiling solvents. The amount of low-boiling solvent may vary between 25 and 50% of the solvent mixture. The addition of the medium-boiling solvent to the low-boiling solvent ensures that the surfaces of the materials to which the cement is applied become tacky before the materials are brought together to be pressed under the action of heat. The nitrocellulose employed in accordance with my invention may be one of normal or medium viscosity, but I prefer to employ a nitrocellulose containing 11% by weight of combined nitrogen and having a viscosity of from 20 to 25.

The following example is given as indicating the preferred composition for the cement of my invention, but it is not to be considered as in any way limitative.

Example

| | Parts by weight |
|---|---|
| Nitrocellulose (11% combined nitrogren of 20 to 25 viscosity) | 100 |
| Methyl phthalyl ethyl glycollate | 80 |
| Acetone | 335 |
| Mono-methyl ether of ethylene glycol | 540 |

In employing the cement of my invention to laminate sheet material, a preferred method is to spray the cement on the contacting surfaces of the sheet materials to be laminated and permitting the treated surfaces to dry long enough to assume a tacky condition, whereupon the materials are superposed one upon the other. The superposed materials are then placed between polishing plates or cardboards in the manner well known in the art and run through cold rollers at full pressure to remove air pockets and to place the sheets of material in contact with each other. The assembly is then left between plates or rollers heated to 350° C. for 45 seconds and then again pased through cold rollers. However, the sheet materials may be composited in a continuous manner by passing the same between a series of heated and chilled rolls.

As stated, the cement of my invention is particularly efficacious in bonding cellulose acetate foil to textile fabric and leather surfaces and the method outlined above is eminently suitable for effecting the lamination. However, the cement of my invention is also useful in cementing other derivative of cellulose foil or thin film such as those made of or containing cellulose nitrate, cellulose propionate, cellulose butyrate, cellulose aceto propionate, cellulose aceto butyrate, ethyl cellulose and benzyl cellulose to sheets of similar or other material.

In cementing derivative of cellulose foil to fabrics or leather with the cement of my invention and by the method outlined above it is found that the foil can be peeled from the fabric or other material to which it is attached only with great difficulty, that the polished finish is excellent and that when the foil is laminated to fabric or leather the resulting product has good flexibility.

It is to be understood that the foregoing detailed description is given merely by way of illustration and that many variations may be made therein without departing from the spirit of my invention.

Having described my invention, what I desire to secure by Letters Patent is:

1. A cement for bonding foils having a basis of a lower fatty acid ester of cellulose to surfaces of textile fabrics and other materials, comprising nitrocellulose and a substance which is a plasticizer for the nitrocellulose and the base of the foil dissolved in a solvent mixture consisting of from 25 to 50% of acetone and from 75 to 50% of mono methyl ether of ethylene glycol.

2. A cement for bonding foils having a basis of cellulose acetate to surfaces of textile fabrics and other materials, comprising nitrocellulose and a substance which is a plasticizer for the nitrocellulose and cellulose acetate dissolved in a solvent mixture consisting of from 25 to 50% of acetone and from 75 to 50% of mono methyl ether of ethylene glycol.

3. A cement for bonding foils having a basis of a lower fatty acid ester of cellulose to surfaces of textile fabrics and other materials, comprising nitrocellulose and a substance which is a plasticizer for the nitrocellulose and the base of the foil in an amount equal to from 60 to 100%, based on the weight of the nitrocellulose present, said nitrocellulose and plasticizer being dissolved in from 600 to 1000%, based on the weight of the nitrocellulose present, of a solvent mixture consisting of 25 to 50% acetone and from 75 to 50% of mono methyl ether of ethylene glycol.

4. A cement for bonding foils having a basis of cellulose acetate to surfaces of textile fabrics and other materials, comprising nitrocellulose and a substance which is a plasticizer for the nitrocellulose and cellulose acetate in an amount equal to from 60 to 100%, based on the weight of the nitrocellulose present, said nitrocellulose and plasticizer being dissolved in from 600 to 1000%, based on the weight of the nitrocellulose present, of a solvent mixture consisting of from 25 to 50% of acetone and from 75 to 50% of mono methyl ether of ethylene glycol.

5. A cement for bonding foils having a basis of a lower fatty acid ester of cellulose to surfaces of textile fabrics and other materials, comprising 100 parts by weight of nitrocellulose and 80 parts by weight of methyl phthalyl ethyl glycollate dissolved in a solvent mixture consisting of 335 parts by weight of acetone and 540 parts by weight of monomethyl ether of ethylene glycol.

6. A cement for bonding foils having a basis of cellulose acetate to surfaces of textile fabrics and other materials, comprising 100 parts by weight of nitrocellulose and 80 parts by weight of methyl phthalyl ethyl glycollate dissolved in a solvent mixture consisting of 335 parts by weight of acetone and 540 parts by weight of monomethyl ether of ethylene glycol.

7. A cement for bonding foils having a basis of cellulose acetate to surfaces of textile fabrics and other materials, comprising 100 parts by weight of nitrocellulose, having a combined nitrogen content of 11% and a viscosity of 20 to 25, and 80 parts by weight of methyl phthalyl ethyl glycollate dissolved in a solvent mixture consisting of 335 parts by weight of acetone and 540 parts by weight of mono methyl ether of ethylene glycol.

BJORN ANDERSEN.